United States Patent
Hwang et al.

(10) Patent No.: US 8,243,633 B2
(45) Date of Patent: Aug. 14, 2012

(54) ENHANCED UPLINK DEDICATED CHANNEL—APPLICATION PROTOCOL OVER LUB/LUR

(75) Inventors: Woonhee Hwang, Espoo (FI); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 159 days.

(21) Appl. No.: 10/802,391

(22) Filed: Mar. 16, 2004

(65) Prior Publication Data

US 2005/0207359 A1    Sep. 22, 2005

(51) Int. Cl.
*H04W 4/00* (2006.01)
(52) U.S. Cl. ........ 370/278; 370/329; 370/469; 370/252; 370/502; 370/320; 455/437; 455/452.1; 455/436; 455/560
(58) Field of Classification Search ............... 455/452.2, 455/436, 502–503, 561, 422, 437, 560, 522, 455/442, 423; 370/331, 329, 278, 335, 320, 370/342, 252, 350, 352, 469, 502; 714/704
See application file for complete search history.

(56) References Cited

U.S. PATENT DOCUMENTS

| | | | |
|---|---|---|---|
| 5,920,705 A | 7/1999 | Lyon et al. | 395/200.7 |
| 6,434,396 B1 * | 8/2002 | Rune | 455/502 |
| 6,539,030 B1 * | 3/2003 | Bender et al. | 370/469 |
| 6,889,050 B1 * | 5/2005 | Willars et al. | 455/452.2 |
| 7,181,223 B1 * | 2/2007 | Pecen et al. | 455/452.1 |
| 2002/0012321 A1 * | 1/2002 | Rune et al. | 370/252 |
| 2002/0061764 A1 * | 5/2002 | Kim et al. | 455/522 |
| 2002/0159410 A1 * | 10/2002 | Odenwalder et al. | 370/329 |
| 2002/0183053 A1 * | 12/2002 | Gopalakrishna et al. | 455/423 |
| 2002/0191556 A1 * | 12/2002 | Krishnarajah et al. | 370/329 |
| 2002/0191579 A1 | 12/2002 | Terry et al. | 370/342 |
| 2003/0228876 A1 * | 12/2003 | Hwang | 455/522 |
| 2003/0232622 A1 * | 12/2003 | Seo et al. | 455/437 |
| 2004/0015750 A1 * | 1/2004 | Obuchi et al. | 714/704 |
| 2004/0160925 A1 * | 8/2004 | Heo et al. | 370/335 |
| 2004/0192308 A1 * | 9/2004 | Lee et al. | 455/436 |
| 2004/0229649 A1 * | 11/2004 | Nishimura et al. | 455/560 |
| 2005/0013263 A1 * | 1/2005 | Kim et al. | 370/320 |
| 2005/0157680 A1 * | 7/2005 | Zhang et al. | 370/331 |

FOREIGN PATENT DOCUMENTS

| | | |
|---|---|---|
| EP | 0994634 | 4/2000 |
| EP | 1041850 | 10/2000 |
| EP | 1209939 | 5/2002 |

(Continued)

OTHER PUBLICATIONS

3GPP TR 25.931 V5.1.0; "UTRAN Functions, Examples on Signalling Procedures"; whole document; Jun. 2002.

(Continued)

*Primary Examiner* — Kiet Doan
*Assistant Examiner* — Michael Vu
(74) *Attorney, Agent, or Firm* — Harrington & Smith

(57) ABSTRACT

Parameters are defined for use on an interface (lub/lur) between network elements to enable configuration setup of an enhanced radio uplink (UL E-DCH). The basic Information Elements (IEs) are defined to support UL E-DCH functionality in the network on lub/lur. Particular parameters are shown for communication over the lub/lur interface between the RNCs and the Node Bs in order to be able to setup and re-configure the UL E-DCH channel. Flexibility is provided so as not to be restricted to any particular message or information element, but to be applicable to any selected message or messages in a given protocol.

16 Claims, 2 Drawing Sheets

FOREIGN PATENT DOCUMENTS

| | | |
|---|---|---|
| JP | 2005-527147 | 9/2005 |
| RU | 2189072 | 9/2002 |
| WO | WO 01/56314 | 8/2001 |
| WO | WO 01/76098 | 10/2001 |
| WO | WO 03/000989 A2 | 12/2003 |
| WO | WO 03/100989 | 12/2003 |
| WO | WO 03/107694 | 12/2003 |

OTHER PUBLICATIONS

TSG-RAN Meeting #17, RP-020658; "Uplink Enhancements for Dedicated Transport Channels"; whole document; Sep. 3-6, 2002.

Lucent Technologies; 3GPP TSG-RAN1 #29; "Enhancing the Uplink DSCH—Scheduling Options"; pp. 1-6; Nov. 5-8, 2002.

3GPP TR 25.896 V1.3.1; "Feasibility Study for Enhanced Uplink for UTRA FDD"; pp. 16-25; Feb. 2004.

Japanese Patent Office; Notice of Reasons for Rejection for application No. 2007-503428; pp. 1-8; May 19, 2009.

The Patent Office of the People's Republic of China; The First Office Action; pp. 1-6; Apr. 17, 2009.

Russian Patent Office; "Office Action"; whole document; Mar. 13, 2010.

* cited by examiner

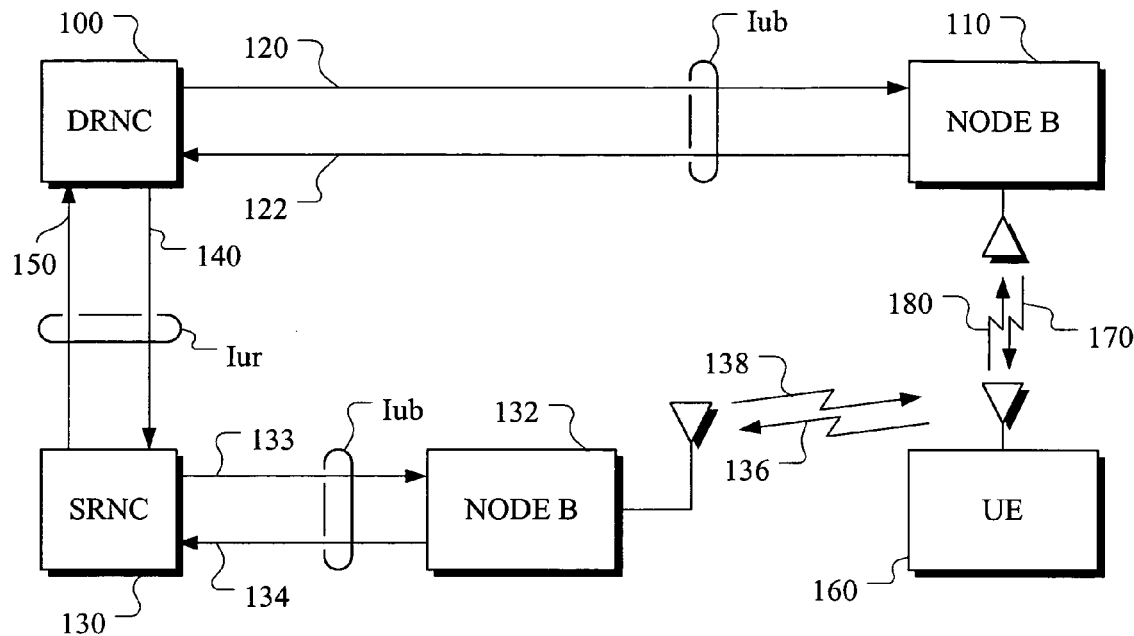
FIG. 1
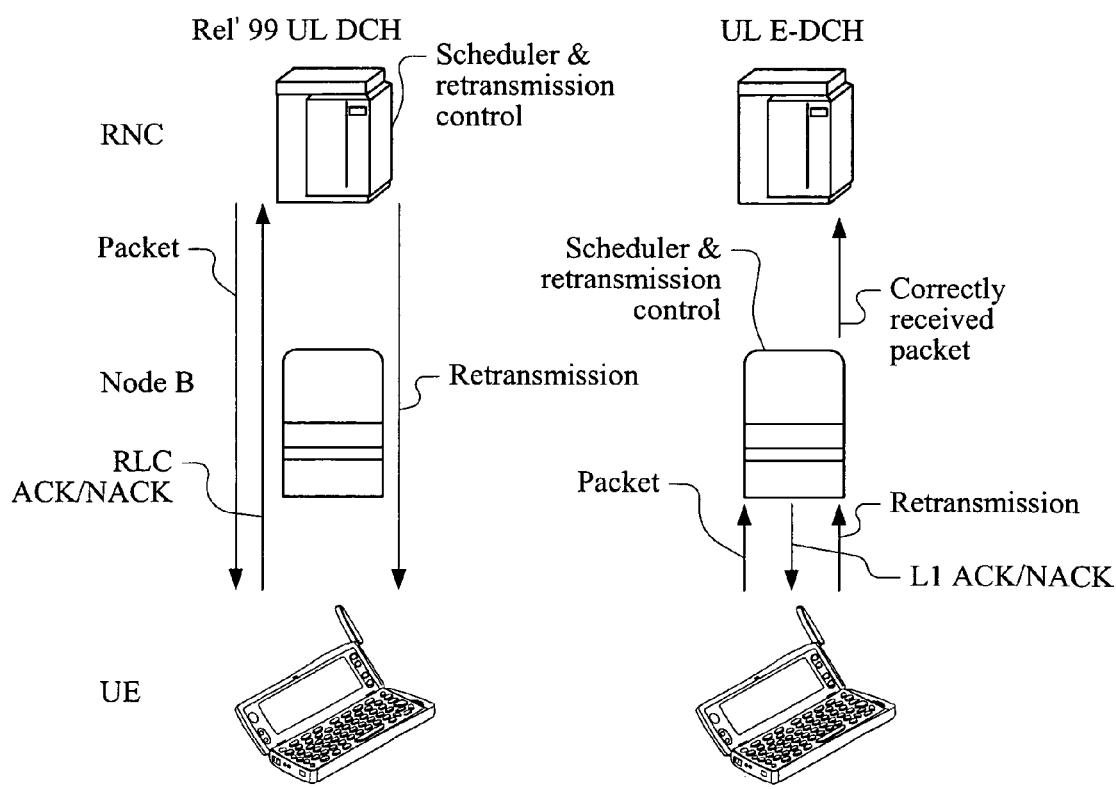
FIG. 2  FIG. 3

ENHANCED UPLINK DEDICATED CHANNEL—APPLICATION PROTOCOL OVER LUB/LUR

BACKGROUND OF THE INVENTION

1. Field the Invention

The present invention relates to an enhanced mobile communications uplink (the direction of the radio link from the user equipment to the network) and, more particularly, to the content of messages needed between a third generation a radio network controller (RNC) and base station (Node B) to carry out the enhancement within a mobile communications network.

2. Discussion of Related Art

To enhance the DCH (Dedicated Channel) performance, the Third Generation Partnership Project (3GPP) agreed on a Release 6 Study Item, 'Uplink Enhancements for Dedicated Transport Channels' in October 2002. The justification of the study item was that since the use of IP (Internet Protocol) based services is becoming more important there is an increasing demand to improve the coverage and throughput as well as to reduce delay in the uplink. Applications that could benefit from an enhanced uplink (UL E-DCH) may include services like video-clips, multimedia, e-mail, telematics, gaming, video-streaming, etc. This study item investigates enhancements that can be applied to UMTS (Universal Mobile Telecommunications System) Terrestrial Radio Access (UTRA) in order to improve the performance on uplink dedicated transport channels.

The study includes the following topics related to enhanced uplink for UTRA FDD (Frequency Division Duplex) to enhance uplink performance in general or to enhance the uplink performance for background, interactive and streaming based traffic:

Adaptive modulation and coding schemes
  Hybrid ARQ (Automatic Repeat Request) protocols
  Node B controlled scheduling
  Physical layer or higher layer signaling mechanisms to
    support the enhancements
  Fast DCH setup
  Shorter frame size and improved QoS (Quality of Service)

This UL E-DCH can be compared to HSDPA (High Speed Downlink Packet Access) since HSDPA was for a similar enhancement in the downlink (DL).

SUMMARY OF THE INVENTION

In this invention disclosure, signalling over the interfaces (lub/lur) between the 3GPP radio network controller (RNC) and Node B and between RNCs, including parameters, is shown to support the air interface enhancement on UL DCHs.

Currently no description can be found from 3GPP specifications or technical reports as to what kind of parameters should be added in which messages in the lub/lur application protocol to support UL E-DCH. The present invention defines the basic Information Elements (IEs), which should be provided to set up and to support E-DCH functionality in the network on lub/lur.

Thus the goal of this invention is to provide general signalling methods for the lub/lur interface between the RNCs and the Node Bs in order to be able to setup and re-configure the UL E-DCH channel. It is another object to do so with maximum flexibility so as not to be restricted to any particular message, but to be later applicable to any selected message or messages in the yet undefined protocol.

According to a first aspect of the present invention, a method for configuring a radio uplink from a user equipment to a network element, comprises the steps of sending an information element having a cell specific parameter, a radio link specific parameter, or both in one or more messages on an interface between the network element and a radio network controller for said configuring the radio uplink, configuring the radio uplink at the network element after signalling between the network element and the user equipment, and sending a payload packet from the user equipment to the network element over the radio uplink after the uplink is configured at the network element for sending the payload packet to the radio network controller.

In further accord with the first aspect of the present invention, the method further comprises the steps of acknowledging correct reception of the payload packet at the network element on a radio downlink from the network element to the user equipment, and sending the payload packet from the network element to the radio network controller following the correct reception from the user equipment.

In still further accord with the first aspect of the present invention, the method further comprises the step of sending the information element on an interface between the radio network controller and another radio network controller for relay to another network element for configuring an uplink between the other network element and the user equipment.

According to a second aspect of the present invention, a mobile telecommunications system comprises a network element and a radio network controller connected by a signalling interface for configuring a radio uplink from a user equipment to the network element, the interface for conveying messages having information elements containing parameters, characterized in that an information element having a cell specific parameter, a radio link specific parameter, or both, is conveyed in one or more messages on the interface between the network element and the radio network controller for said configuring the radio uplink at the network element after signalling between the network element and the user equipment, and that a payload packet is sent from the user equipment to the network element over the radio uplink after the uplink is configured at the network element for sending the payload packet to the radio network controller.

In further accord with the second aspect of the present invention, the system is further characterized in that reception of the payload packet is acknowledged by the network element on a radio downlink from the network element to the user equipment, and that the payload packet is sent from the network element to the radio network controller following the reception from the user equipment.

In still further accord with the second aspect of the present invention, the system is further characterized in that the information element is sent on an interface between the radio network controller and another radio network controller for relay to another network element.

According to a third aspect of the present invention, a data structure is provided for at least temporary storage in a computer readable medium, the data structure comprising an information element having a cell specific parameter, a radio link specific parameter, or both for transfer in one or more messages on an interface between a network element and a radio network controller for configuring a radio uplink from a user equipment to the network element wherein the configuring is carried out at the network element for enabling transmission of a payload packet from the user equipment to the network element over the radio uplink and from there to the radio network controller.

In further accord with the third aspect of the present invention, the data structure is characterized in that the transmission of the payload packet from the user equipment to the network element is followed by acknowledgement of correct reception of the payload packet by the network element on a radio downlink from the network element to the user equipment and transmission of the payload packet from the network element to the radio network controller.

According to a fourth aspect of the present invention, a radio network controller for configuring a radio uplink from user equipment to a network element, comprises a first interface for communicating an information element having a cell specific parameter, a radio link specific parameter, or both in one or more messages on the first interface between the network element and the radio network controller for said configuring the radio uplink; and a second interface for communicating the information element having a cell specific parameter, a radio link specific parameter, or both in the one or more messages on the second interface between the radio network controller and a second radio network controller connected to a second network element, wherein the information element having a cell specific parameter, a radio link specific parameter, or both in one or more messages is for configuring a second radio uplink between the second network element and the user equipment, the first radio network controller for receiving a payload packet from the network element over the first interface, the second radio network controller for receiving the payload packet from the second network element after receipt by the second network element from the user equipment over the second radio uplink, the second network element for sending the payload packet received from the second network element to the radio network controller following the reception by the second network element from the user equipment for transfer from the second network controller to the first network controller.

According to a fifth aspect of the present invention, a network element for receiving an uplink channel on a radio link from user equipment to the network element, comprises a non-radio interface for communicating an information element having a cell specific parameter, a radio link specific parameter, or both in one or more messages between the network element and a radio network controller for configuring the uplink channel on the radio link; and a radio interface for communicating signalling relating to the configuring the uplink channel between the network element and the user equipment and for receiving a payload packet from the user equipment to the network element over the radio uplink after the configuring the uplink channel on the radio link is carried out by the network element, wherein the non-radio interface is for conveying the payload packet from the network element to the radio network controller following the reception by the network element from the user equipment.

According to a sixth aspect of the present invention, a user equipment for communicating packets on an enhanced uplink from the user equipment to a network element, the user equipment having a transmitter (192) and a receiver (190) together connected to an antenna for transmitting and receiving signals over a radio interface between the user equipment and the network element is characterized in that the user equipment also includes a control for processing signalling between the network element and the user equipment for configuring a radio uplink from the user equipment to a network element, wherein an information element is sent having a cell specific parameter, a radio link specific parameter, or both in one or more messages on an interface between the network element and a radio network controller for the configuring the radio uplink, wherein the radio uplink is configured at the network element, the user equipment, or both, after signalling between the network element and the user equipment, and wherein a payload packet is sent from the user equipment to the network element over the radio uplink after the uplink is configured and then sent from the network element to the radio network controller.

According to a seventh aspect of the present invention, a data structure for at least temporary storage in a computer readable medium, the data structure is characterized by an information element having a cell specific parameter, a radio link specific parameter, or both for transfer in one or more messages on an interface between a network element and a user equipment for configuring a radio uplink from the user equipment to the network element wherein the configuring is carried out at the network element, the user equipment, or both for enabling transmission of a payload packet from the user equipment to the network element over the radio uplink and from there to the radio network controller.

In further accord with the seventh aspect of the present invention, the data structure is characterized in that the transmission of the payload packet from the user equipment to the network element is followed by acknowledgement of correct reception of the payload packet by the network element on a radio downlink from the network element to the user equipment and transmission of the payload packet from the network element to the radio network controller.

These and other objects, features and advantages of the present invention will become more apparent in light of a detailed description of a best mode embodiment thereof which follows, as illustrated in the accompanying drawing.

BRIEF DESCRIPTION OF THE DRAWINGS

FIG. 1 shows signalling between the interfaces (Iub/Iur) between the 3 GPP network element called "Node B" (or "base station") and radio network controller (RNC) and between RNCs, including parameters, according to the present invention, to support the air interface uplink enhancement.

FIG. 2 shows a prior art packet transmission on a radio uplink from a User Equipment (UE) to a Radio Network Controller (RNC) via a Node B which is comparable to a base station of a second generation system and a retransmission of the packet upon receiving a negative acknowledgement from the RNC to the UE.

FIG. 3 shows a proposal, according to an enhanced uplink dedicated channel (E-DCH) concept to enhance the uplink by moving the scheduler and retransmission control from the RNC to the Node B but which proposal has not yet explained the information elements and parameters needed for exchange between an RNC and a Node B and between RNCs.

DETAILED DESCRIPTION OF INVENTION

Figure 4:
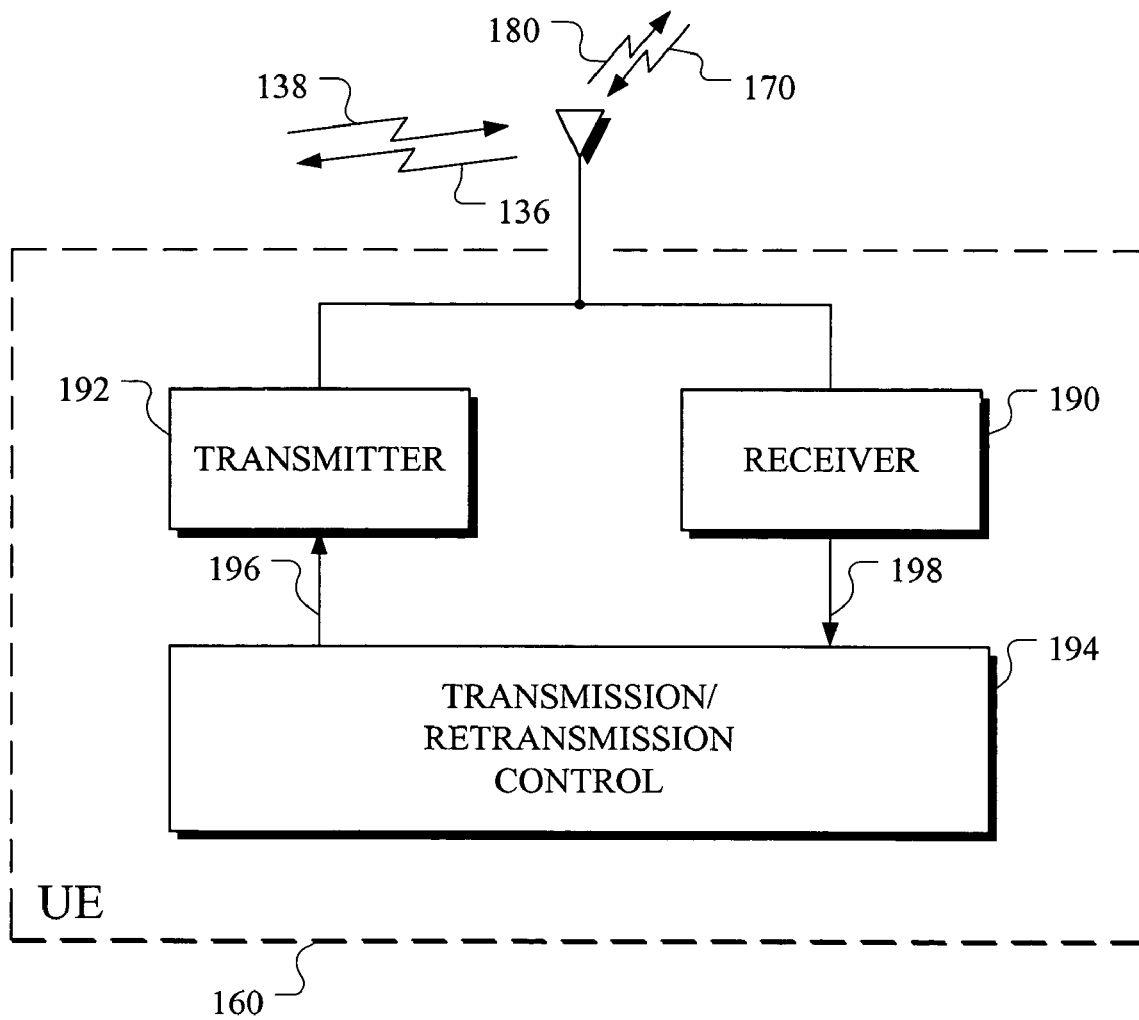
FIG. 4 shows a User Equipment (UE) such as the user equipment of FIGS. 1 and 3, according to the present invention.

An enhanced uplink dedicated channel is currently proposed in 3GPP standardization committees in order to provide uplink enhancements for Dedicated Transport Channels. In relation to enhanced uplink for UTRA FDD (Frequency Division Duplex) uplink performance may be enhanced by improved Hybrid ARQ (Automatic Repeat Request) protocols and Node B controlled scheduling. Physical layer or higher layer signaling mechanisms may also be provided to support the enhancements.

An UL E-DCH can be compared to HSDPA (High Speed Downlink Packet Access) since HSDPA was for a similar enhancement in the downlink (DL).

FIG. 2 shows a payload packet sent from a User Equipment (UE) over an uplink radio interface to a base station (Node B) and from there to a Radio Network Controller (RNC) connected to the Node B by means other than a radio link. The RNC replies with a radio link control (RLC) acknowledgment, indicating either success (ACK) or failure (NACK) in receipt of the payload packet. By "payload" is meant information distinct from configuration information such as setup, scheduling or retransmission control signalling, i.e., for use by the user of the user equipment after setup or reconfiguration in an application such as a web page, video, text, etc. Thus, preceding any exchange of payload information there will be a distinct configuration setup, scheduling, or retransmission control signalling procedure. Examples of third generation signalling procedures are shown in detail in 3GPP TR 25.931 v5.1.0 (2002-06).

FIG. 3 shows a proposal, according to an enhanced uplink dedicated channel (E-DCH) concept. One aspect of the improvement is to enhance the uplink by moving the acknowledgement function from the RNC to the Node B. The acknowledgement function is a known retransmission control function that is normally controlled at the RNC and need not be described here. What is important here is the network entity selected to perform this function. The E-DCH concept helps reduce delays by making the Node B take on control of this important function closer to the UE. The E-DCH proposal has not yet explained the information elements and parameters needed to be exchanged in the above-mentioned distinct signalling procedures between an RNC and a Node B, between the Node B and the user equipment, and also between RNCs in order to carry out such a change.

Another aspect of the E-DCH concept is "fast" Node B configuration control for uplink scheduling/loading. In other words, instead of the RNC, the Node B would be in configuration control of scheduling and/or congestion. Again, this reduces delays. The RNC sends information about the user equipment capabilities, cell specific parametrization and user equipment specific parametrization information related to E-DCH to the Node B. The configuration capabilities signalled might for instance include the number of HARQ processes, the modulation supported, the maximum data rate, etc. The cell specific parametrization could include setting up shared control channels, allocation of hardware and power resources for E-DCH, etc. The user equipment specific parametrization could include maximum data rate RNC allows the Node B to allocate to the UE, the power offsets and signalling repetition factors to be used for signalling to that UE and by that UE etc. Generally, the user equipment may send signalling to the Node B to assist the Node B scheduler and the Node B may send signalling back to the user equipment that informs the user equipment of its data rates or limits them. Thus, the user equipment may (or may not) signal the Node B information to help the Node B scheduler. As examples, the user equipment could request a data rate from the Node B or it could just send information on how much data it has and how much transmit power it is able to use. The Node B may (or may not) signal the scheduling commands to the UE. For instance, the Node B could signal the user equipment with a (maximum) data rate. This maximum data rate might then be valid until a new one is signalled by the Node B, or for a specific time period; or, it may change according to some specific rules, e.g., related to the usage of data rates.

FIG. 1 shows an exchange of information elements and parameters in such a distinct configuration signalling procedure such as a setup procedure. Configuration messages are exchanged between a Radio Network Controller (RNC) which in this case is shown as a "serving" RNC 130 and a so-called "Node B" 132, according to the present invention, for configuring an enhanced uplink dedicated channel (E-DCH) for a User Equipment 160. The Node B 132 is a third generation base station. Between the SRNC 130 and the Node B 132 is a so-called Iub interface (non-radio). According to the present invention, configuration messages for E-DCH are defined for exchange over the Iub interface, for example, on a signalling line 133 from the SRNC 130 to the Node B 132 and on a signalling line 134 in the reverse direction from the Node B 132 to the SRNC 130.

As known in the art, when the UE moves into the range of another Node B 110 which may be connected to another RNC 100, there may be a need for communication of signalling similar to that exchanged over the Iub interface lines 133, 134 over a so-called Iur interface between the SRNC 130 and another RNC 100 which may be designated a "drift" RNC (DRNC) connected to the other Node B 110. Between the SRNC 130 and the DRNC 100, a configuration setup message signal is shown on a line 150 from the SRNC 130 to the DRNC 100 and a configuration setup message signal in the reverse direction is shown on a line 140 between the DRNC 100 and the SRNC 130. These signals are provided over a so-called Iur interface which is a non-radio interface. A message signal is shown on a line 120 from the DRNC 100 to the other Node B and a message signal in the reverse direction is shown on a line 122 from the Node B 110 to the DRNC 100. Together, these signals form another Iub interface which is also a non-radio interface. For a given situation, the information elements and parameters of the present invention may be carried over one or all of these Iur and Iub interfaces. It should be understood that the example given is not exhaustive as will be made clear by reference to 3GPP TS 25.931. The other Node B 110 is shown in communication with the UE 160 via a radio downlink 170 and a radio uplink 180. Similarly, the Node B 132 is shown in communication with the UE 160 via a radio downlink 135 and a radio uplink 136.

For background information, in third generation systems, it will thus be understood, the RNC 130 may be in communication with another RNC 100 which may, with respect to a given UE, be a Drift RNC (DRNC) or a Serving RNC (SRNC) over the so-called Iur interface. The SRNC 130 of FIG. 1 is the "serving" RNC for UE 160. It is connected to other Node Bs (not shown) in other cells. The UE 160 is currently located in the cell of one of the Node Bs connected to the SRNC 130 and is in radio communication with that Node B as well as the Node B 110 because it may be in proximity to the other Node B 110. The UE 160 is currently being "served" by the SRNC 130. The UE 160 may however be travelling toward the cell of Node B 110 connected to RNC 100 (called the "drift" RNC) and could be handed over to that cell. The UE would then either be "served" by RNC 100 and RNC 100 would become the SRNC for the UE or the RNC 130 may still continue "serving" the UE i.e. functioning as SRNC and the RNC 100 would still remain as "drift" RNC. By establishing the Iur interface, the third generation improves over the "hard-handover" situation of the second generation by providing the UE the ability to communicate with multiple Node Bs at the same time. A "soft-handover" is thereby enabled that does not require re-synchronization and, unlike second generation systems, makes the handover imperceptible to the user. For purposes of the present invention, however, the details of the soft handover process is secondary. The important thing here is the nature of the parameters disclosed below and transmitted in information elements contained in messages transmitted over the Iur/Iub interface.

The message signal on the line 122 from the Node B 110 may therefore be forwarded on a line 140 to the SRNC 130. Likewise, the message signal on the line 120 from the RNC 100 most likely would have originated as a signal on a line 150 from the SRNC 130 to the RNC 100 and forwarded from there on the line 120 to the Node B 110.

FIG. 4 shows the UE of FIG. 1 or FIG. 3 at a level of detail sufficient to show the elements needed to carry out the present invention. The UE 160 includes a receiver 190 responsive to the downlink 170 from the Node B 110 and the downlink 138 from the Node B 132. The UE 160 also includes a transmitter 192 for providing the uplink 180 from the UE to the Node B 110 and the uplink 136 from the UE 162 the Node B 132. A retransmission control 194 provides a signal on a line 196 to the transmitter 192 and receives a signal 198 from the receiver 190. Referring both to FIGS. 3 and 4, an acknowledge/negative acknowledge signal may be received on one or both of the downlinks 138, 170 by the receiver 190 which in turn provides the received signal on the line 198 to the retransmission control 194. The retransmission control in turn evaluates the acknowledgement or negative acknowledgement signal and decides whether a retransmission is required or not. If a retransmission is required, the retransmission control sees to it that the retransmission is provided on the signal line 196 to the transmitter 192 which in turn transmits a retransmission on one or both of the uplinks 136, 180. The retransmission control 194 can be viewed as a transmission control or a transmission/retransmission control. In other words, a packet is transmitted, retransmitted or both by the control 194.

It should be realized that although a majority of the configuration parameters disclosed herein are disclosed in a way that is more related to how the Node B is to control the data rate of the UE, it is quite possible for the UE to control or have a role in the control of its own data rate. It can be possible for the UE control 194 to take care of not only transmission/retransmission but also data rate adjustments and timing of the transmissions based on the control information received in the downlink.

The present invention discloses various information elements and parameters in general terms without necessarily specifying exactly which existing or new message signal is to be used to communicate the information elements and parameters. There are of course numerous existing messages that may be used for conveying the disclosed information elements (IEs) and parameters and some of them are mentioned hereafter as candidates but it is foreseen that others may be used as well some of which may not yet be defined. One of the more important decisions yet to be made involves which network entity, node, or element will decide the values of parameters.

A radio network controller, according to the present invention, has an E-DCH configuration signalling interface comprising the information elements and parameters described in further detail below and exchanged over the Iub lines 133, 134 or over the Iur lines 140, 150, or both. A Node B, according to the present invention, has an E-DCH configuration signalling interface comprising the information elements and parameters described in further detail below and exchanged over the Iub lines 133, 134 or 120, 122. A system, according to the present invention, has one or more radio network controllers and at least one Node B each with an E-DCH configuration signalling interface as described above and comprising the information elements and parameters described in further detail below.

Depending on which network node will decide the values of the parameters, the following cases can be considered:

1) The RNC decides the value and informs Node B. Node B follows the decision. Even though the Node B may now be taking on functions that were previously the RNC's responsibility, it does not work completely independently. The RNC provides the Node B with a set of parameters according to which it should then perform these functions. One could think of the RNC as a manager and Node B as the worker working according to the guidelines and on the UEs the RNC has commanded the Node B to work on. But the manager is always right and in overall control.

2) The RNC gives the boundaries within which choices may be made by Node B. Node B can decide the value according to its present condition within the boundaries given. The RNC could signal the UE capabilities, such as its maximum supported data rate capability, to the Node B, but as well it should signal some parametrization like how Node B resources are to be allocated for E-DCH, what are the repetition factors and power offsets etc. to be used for that UE, what is the maximum data rate currently allowed by the RNC to be given to the UE, etc.

3) Node B proposes a value to RNC and RNC confirms or decides the value. (In this case RNC has freedom not to accept Node B's proposal.)

4) Node B decides the value dynamically and RNC doesn't need to know it.

5) Others can certainly be contemplated as well and these are just examples.

It should be also considered whether both the UE and the network have to have the same value for a certain parameter. In this case the SRNC has to know the value of the parameter to inform it to UE via an RRC (Radio Resource Control) message. Case (1) and Case (3) can be used for this case.

Case (2) is a typical procedure for a Cell specific parameter. That means RNC configures the E-DCH resource pool and Node B decides the exact value according to the air interface situation.

Case (3) is valid in case that Node B knows the resource situation, the air interface condition, other E-DCH parameter usage but SRNC has to manage the overall resource situation.

Since the Layer 1 concept of E-DCH is still under discussion in 3GPP and UTRAN signalling hasn't been discussed, this invention covers all the possibilities. The parameters which are proposed in this invention can be delivered to another network node (Node B or RNC) in any of the procedures listed above and the message used to carry out a given procedure can already exist in the existing Iub/Iur Application protocol (i.e., reuse the existing procedures) or new procedures (i.e., define new procedures and messages for E-DCH parameter delivery).

According to the present invention, parameters are provided on the Iub interface, the Iur interface, or both, that define either cell-specific parameters, RL-specific parameters, or both, for E-DCH. Such may include but are not limited to the following parameters: (1) Prx_nrt_Node B, (2) Prx_Target, (3) Node B TFCI Threshold, (4) UE TFCI Threshold, (5) ACK-NACK Power Offset, (6) ACK-NACK Repetition Factor, (7) Rate Grant Power Offset, (8) Rate Grant Repetition Factor, (9) UE Threshold Dtx, (10) UE Threshold Dtx Delay, (11) UE Capability Information, (12) HARQ Memory Partitioning, (13) Guideline Information for Node B Scheduling, (14) QoS, (15) delay due to UE Ptx Power and (16) TrCH under Node B control. The nature of each of these parameters is explained in more detail below.

To support the E-DCH in a cell, new semi-static IEs (cell related parameters) which configure E-DCH resources in a cell can be added in Cell Setup/Cell Reconfiguration procedure or Common Transport Channel Setup/Common Transport Channel Reconfiguration procedure or Physical Shared Channel Reconfiguration procedure or a new procedure.

Prx_nrt_Node B

Prx_Target

These parameters are given to Node B by the CRNC (Controlling Radio Network Controller) to limit the Node B scheduling freedom. The meaning of each parameter will be explained below.

Radio Link (RL) related IEs, to setup and re-configure E-DCH channels are listed below. The parameters conveyed on the line 133 from the SRNC to the Node B 132 can be added into a Radio Link Setup Request message, in a Radio Link Reconfiguration Prepare message, in a Radio Link Reconfiguration Request message or in some new message yet to be defined.

The parameters conveyed on the line 134 from Node B 132 to SRNC 130 can be added into a Radio Link Setup Response message, a Radio Link Reconfiguration Ready message, a Radio Link Reconfiguration Response message or can be conveyed in a new message that has not yet been defined or standardized. As in the Case (3), if Node B 132 has to propose a value for a parameter, it can reuse the Radio Link Parameter Update Indication message or define a new message for delivery on the line 134 to the RNC 130. After the SRNC 130 receives the proposal from Node B 132, it can reuse the Synchronised/Unsynchronised Radio Link Reconfiguration procedure or define a new procedure. The same parameters to setup and re-configure may be exchanged between the SRNC 130 and the other Node B 110 via the DRNC 100 using the Iur interface 140, 150 between the SRNC 130 and the DRNC 100 and the Iub interface 120, 122 between the DRNC 100 and the other Node B 110.

E-DCH Information
        Payload CRC Presence Indicator
        UL FP Mode
        ToAWS
        ToAWE
        DCH ID
        UL Transport Format Set
        DL Transport Format Set
        Allocation/Retention Priority
    Frame Handling Priority
    QE-Selector
    Unidirectional DCH Indicator
    Node B TFCI Threshold
    UE TFCI Threshold
    ACK PO
    NACK PO
    ACK Repetition Factor
    NACK Repetition Factor
    Rate Grant PO
    Rate Grant Repetition Factor
    Rate Request PO
    Rate Request Repetition Factor
    Guideline Information for Node B Scheduling
    QoS Parameters (like Traffic Handling Priority, GBR, discard timer etc.)
    UE Threshold Dtx
    UE Threshold Dtx Delay
    Delay due to UE Ptx Power
    TrCH under Node B control
    UE Capability Information
        HARQ Capacity
            NumOfChannel
            MaxAttempt
            RedundancyVer
    E-DCH Information Response
        DCH ID
        Binding ID
        Transport Layer Address
    HARQ Memory Partitioning
    E-DCH Information to modify: Same with E-DCH Information The meanings of IEs, which are defined in the DCH FDD Information IE group and DCH Information Response IE group, are same with the definitions in 3GPP specification. The additional IEs will be explained further below. Furthermore, the IE structure shows only one example. Thus it could be vary without contradicting the main concept of invention.

Cell Specific Parameters

These IEs can be included in CELL SETUP REQUEST message or/and CELL RECONFIGURATION REQUEST message or Common Transport Channel Setup message or/and Common Transport Channel Reconfiguration Request message or Physical Shared Channel Reconfiguration Request message or a new message from CRNC to Node B.

Prx_nrt_NodeB

The Prx_nrt_NodeB IE defines the total allowable interference due to E-DCH users. Node B scheduler has to take this into account when it grants bit rates to UEs. The scheduler may not let the sum of E-DCH users' noise rise exceed this value. In principle this is the part of load reserved for E-DCH users.

| IE/Group Name | Presence | Range | IE type and reference | Semantics description |
|---|---|---|---|---|
| Prx_nrt_NodeB | | | | |

In case the throughput based RRM is used, some other parameter than Prx_nrt_NodeB IE can be used like allowed bitrate. Which RRM algorithm will be used should be decided later. In addition to Prx_nrt_NodeB, Node B needs to have knowledge to link between the data rate it will assign to UE and the consumption of Prx_nrt_NodeB as well. How Node B will obtain this information has to be decided later.

Prx_Target

The Prx Target IE defines the target of the total uplink load of the cell to help Node B scheduling. Thus Node B can optimize the capacity in a cell even if there are not so many E-DCH users in a cell.

| IE/Group Name | Presence | Range | IE type and reference | Semantics description |
|---|---|---|---|---|
| Prx Target | | | | |

RL Specific Parameters

The following explains RL specific parameters. Parameters from SRNC to Node B can be included in a Radio Link Setup Request message, a Radio Link Reconfiguration Prepare message, or a Radio Link Reconfiguration Request message. Otherwise a new message can be defined for E-DCH parameter delivery. Parameters from Node B to SRNC can be added in a Radio Link Setup Response message, a Radio Link Reconfiguration Ready message, or a Radio Link Reconfiguration Response message. Otherwise a new message can be defined for this purpose. Parameters which have to have the same values in both the network and the UE have to have the same values (e.g., Power Offsets, Repetition Factors, etc. . . . ) and on which Node B has better idea than SRNC, can be included in the Radio Link Parameter Update Indication message or a new message to allow Node B to be able to indicated its willingness of changing the parameter to SRNC.

| IE/Group Name | Presence | Range | IE type and Reference | Semantics description | Criticality | Assigned Criticality |
|---|---|---|---|---|---|---|
| E-DCH Information | | 0 . . . 1 | | | YES | reject |
| >Prx_nrt_NodeB | | | | | | |
| >Prx Target | | | | | | |

Since the E-DCH users are basically DCH user, basic parameters (i.e., not E-DCH specific) are already defined in the earlier release. (e.g., TFCI) Therefore in this section, only new E-DCH parameters are explained.

Node B TFCI Threshold (SRNC→Node B)

The Node B TFCI Threshold IE sets the maximum data rate TFC the Node B scheduler is allowed to grant to the UE.

| IE/Group Name | Presence | Range | IE type and reference | Semantics description |
|---|---|---|---|---|
| Node B TFC Threshold | | | INTEGER | |

UE TFCI Threshold (SRNC→Node B)

The UE TFCI Threshold IE sets the maximum data rate TFC the UE is allowed to use. After receiving this value from the RNC, the Node B scheduler can adjust this parameter independently and signal it to the UE in the limits of Node B TFCI Threshold.

| IE/Group Name | Presence | Range | IE type and reference | Semantics description |
|---|---|---|---|---|
| UE TFC Threshold | | | INTEGER | |

ACK/NACK Power Offset (SRNC→Node B)

The ACKNACK PO IE is assigned by SRNC as similar way than HSDPA. With this PO Node B can set the power of Hybrid ARQ ACK/NACK information transmission to the UE. Note that ACK and NACK could be signalled with different power offsets thus having a dedicated IE for ACK power offset and NACK power offset. Further this or these could be cell specific parameters applicable to all the E-DCH users or radio link specific, i.e. defined separately for each UE.

| IE/Group Name | Presence | Range | IE type and reference | Semantics description |
|---|---|---|---|---|
| ACKNACK PO | | | INTEGER | |

ACK/NACK Repetition Factor (SRNC→Node B)

The ACKNACK Repetition Factor IE is assigned by SRNC as similar way than HSDPA. It defines, how many times the Hybrid ARQ ACK/NACK is repeated. Since ACK/NACK repetition Factor for HSDPA is defined in HSDPA IE group, it is not supposed to be reused.

| IE/Group Name | Presence | Range | IE type and reference | Semantics description |
|---|---|---|---|---|
| ACKNACK Repetition Factor | | | INTEGER | |

Rate Grant Power Offset (SRNC→Node B)

The Rate Grant PO IE is assigned by SRNC as similar way than ACK/NACK PO. With this PO Node B can set the power of the scheduling related downlink signalling. This could be cell specific parameter applicable to all the E-DCH users or radio link specific, i.e. defined separately for each UE.

| IE/Group Name | Presence | Range | IE type and reference | Semantics description |
|---|---|---|---|---|
| Rate Grant PO | | | INTEGER | |

Rate Grant Repetition Factor (SRNC→Node B)

The Rate Grant Repetition Factor IE is assigned by SRNC. It defines, how many times the scheduling related downlink signalling is repeated.

| IE/Group Name | Presence | Range | IE type and reference | Semantics description |
|---|---|---|---|---|
| Rate Grant Repetition Factor | | | INTEGER | |

Rate Request Power Offset (SRNC→Node B)

The Rate Request PO IE is assigned by SRNC as similar way than ACK/NACK PO. With this PO Node B knows the power offset applied by the UE to the uplink related scheduling signalling. This parameter makes Node B receiver simpler when it acquires the uplink scheduling signalling information from UE.

| IE/Group Name | Presence | Range | IE type and reference | Semantics description |
|---|---|---|---|---|
| Rate Request PO | | | INTEGER | |

Rate Request Repetition Factor (SRNC→Node B)

The Rate Request Repetition Factor IE is assigned by SRNC. Node B will use this value when it receives Rate Request Information from UE. It defines, how many times the scheduling related uplink signalling is repeated.

| IE/Group Name | Presence | Range | IE type and reference | Semantics description |
|---|---|---|---|---|
| Rate Grant Repetition Factor | | | INTEGER | |

UE Threshold Dtx (SRNC→Node B)

The UE Threshold Dtx IE is assigned by SRNC. Node B scheduler will lower the UE TFCI Threshold to this value after the UE has been inactive for a period set by UE Threshold Dtx Delay

| IE/Group Name | Presence | Range | IE type and reference | Semantics description |
|---|---|---|---|---|
| UE Threshold Dtx | | | INTEGER | |

UE Threshold Dtx Delay (SRNC→Node B)

The UE Threshold Dtx Delay IE defines the inactivity period after which the UE should set the UE TFCI Threshold=UE Threshold Dtx after getting into DTX mode. I.e. If the UE has been inactive (not transmitting any data on E-DCH) for the duration of this delay, the Node B assumes that the UE has no data to transmit or it cannot transmit that data and can perform accordingly.

| IE/Group Name | Presence | Range | IE type and reference | Semantics description |
|---|---|---|---|---|
| UE Threshold Dtx Delay | | | INTEGER | |

Delay Due to UE Ptx Power (SRNC→Node B)

The Delay due to UE Ptx Power IE defines the period in which UE is not using the maximum bit rate due to the UE Ptx Power limitation. If the UE has not been using the maximum allowed data rate for the duration of the delay but has not been completely inactive (i.e. has transmitted some data on E-DCH during the delay but has not been using the maximum allowed data rate), for the duration of this delay, the Node B assumes that the UE is not capable of transmitting with that high a data rate due to power limitation or the UE produces data to transmit in a lower rate than would be the maximum allowed, and can perform accordingly. A proposed functionality would be to drop the maximum allowed data rate to what is indicated by 'UE Threshold DTX' IE.

| IE/Group Name | Presence | Range | IE type and reference | Semantics description |
|---|---|---|---|---|
| Delay due to UE Ptx Power | | | INTEGER | |

TrCH Under Node B Control (SRNC→Node B)

The TrCH under Node B control IE indicates which transport channels are under Node B scheduling control. Thus Node B can use this information for scheduling. (One Coded Composite Transport Channel (CCTrCH) may have a number of transport channels (TrCH) combined to it and it is possible that some of the TrCHs may be controllable to the Node B and some not.)

| IE/Group Name | Presence | Range | IE type and reference | Semantics description |
|---|---|---|---|---|
| TrCH under Node B control | | | | |

UE Capabilities Information or UE Category Information (SRNC→Node B)

The UE Capabilities Information IE provides information related to UE capabilities for E-DCH or alternatively the UE capabilities may be categorized and the UE category parameter can be signalled to the Node B.

| IE/Group Name | Presence | Range | IE type and reference | Semantics descriptions | Criticality | Assigned Criticality |
|---|---|---|---|---|---|---|
| UE Capabilities Information | | | | | | — |
| >Num of HARQ Process | M | | | | | |

Number of HARQ process could be one example in this IE group. And further UE Capability parameters will be defined.

HARQ Memory Partitioning (Node B→SRNC)

The HARQ Memory Partitioning IE provides information for HARQ memory usage.

| IE/Group Name | Presence | Range | IE type and reference | Semantics descriptions | Criticality | Assigned Criticality |
|---|---|---|---|---|---|---|
| Num of Process | M | | INTEGER | | | |
| HARQ Memory Partitioning | | 1 ... <maxnoofHARQprocesses> | | | | |
| >Process Memory Size | M | | INTEGER | | | — |

| Range bound | Explanation |
|---|---|
| Maxnoof HARQprocesses | Maximum number of HARQ processes. |

One possible operation mode of this parameter can be that Node B, depending on the scheduler processing speed etc, decides how many ARQ processes are needed. If the TTI is 10 ms then the number of ARQ processes should be less than with the 2 ms HSDPA TTI. (There were 8 processes with HSDPA, impact of the timing of downlink signaling to be taken into account as well).

Node B informs UE (via SRNC) the number of processes to be used and the memory per ARQ process. One possible way is that UE would be assuming even memory partitioning for all ARQ processes to avoid UE having to determine separately every TTI how much data with what coding can be transmitted in a given TTI.

Further information to give a guideline to Node B scheduling might need. For example Transmission Delay that the UE has to expect before it is allowed to ask for a higher data rate or RLC Buffer size (or RLC Window Size) might need to be signaled to Node B.

Some QoS Parameter (SRNC→Node B)

To help Node B scheduling, information on which UEs have priority when scheduling the data rates, e.g. some QoS parameter (like traffic class, SPI, GBR parameter, discard timer etc. . . . ) might be needed.

Referring back to FIG. 1, each of the network elements including the RNCs 100, 130, the Node Bs 110, 132 and the UE 160 will typically include a signal processor that may be a special or general-purpose signal processor. A central processing unit (CPU) may be provided along with memory devices including both permanent memory and memory for storing information temporarily. Input/output ports are provided and all of these various devices are interconnected by data, address, and control signal lines. The permanent memory may be used to store instructions coded according to a selected computer programming language for carrying out the formation of the messages described above with information elements for conveying the above-described parameters. Therefore, it should be understood that these various components within a given network element or device constitute means for implementing the interfaces disclosed above.

Although the invention has been shown and described with respect to a best mode embodiment thereof, it should be understood by those skilled in the art that various changes, omissions and deletions in the form and detail of the foregoing may be made therein without departing from the spirit and scope of the invention.

ABBREVIATIONS

| | | |
|---|---|---|
| CCTrCH | Coded Composite Transport Channel | |
| CRNC | Control RNC | (network element) |
| E-DCH | Enhanced Dedicated Channel | (transport channel) |
| FDD | Frequency Division Duplex | (operation mode) |
| GBR | Guaranteed Bit Rate | (parameter) |
| HARQ | Hybrid Automatic Repeat Request | (function) |
| HSDPA | High Speed Downlink Packet Access | (concept) |
| IE | Information Element | (protocol) |
| RNC | Radio Resource Controller | (network element) |
| RG | Rate Grant | (L1 message) |
| RR | Rate Request | (L1 message) |
| SPI | Scheduling Priority Indicator | (parameter) |
| SRNC | Serving RNC | (network element) |
| TrCH | Transport Channel | |
| UE | User Equipment | (user device) |

The invention claimed is:

1. A method comprising:
receiving at a network element information having both a cell specific parameter and a radio link specific parameter, in respective messages on an interface between the network element and a radio network controller for configuring a radio uplink from a user equipment to the network element,
configuring the radio uplink at the network element, and
receiving a payload packet from the user equipment to the network element over the radio uplink after the radio uplink is configured at the network element,
wherein at least one of said respective messages enables said configuring the radio uplink, and
wherein prior to said receiving said information on said interface between said network element and said radio network controller, said radio network controller decides a value for said cell specific parameter or said radio link specific parameter, or both, for said sending said information with said cell specific parameter and said radio link specific parameter in said respective messages on said interface from said radio network controller to said network element.

2. The method of claim 1, further comprising:
acknowledging correct reception of the payload packet at the network element on a radio downlink from the network element to the user equipment, and
sending the payload packet from the network element to the radio network controller following said correct reception from the user equipment.

3. The method of claim 1, wherein said receiving by said network element includes receiving at least one parameter indicative of boundaries within which choices may be made by said network element.

4. A method comprising:
sending information having both a cell specific parameter and a radio link specific parameter, in respective messages on an interface to a network element from a radio network controller for configuring a radio uplink from a user equipment to the network element, and
receiving a payload packet from the network element after the payload packet has been sent from the user equipment to the network element over the radio uplink that has been configured,
wherein at least one of said respective messages enables said configuring the radio uplink, and
wherein prior to said sending said information on said interface between said network element and said radio network controller, said radio network controller decides a value for said cell specific parameter or said radio link specific parameter, or both, for said sending said information with said cell specific parameter and said radio link specific parameter in said respective messages on said interface from said radio network controller to said network element.

5. The method of claim 4, wherein said sending by said radio network controller includes sending at least one parameter to said network element indicative of boundaries within which choices may be made by said network element.

6. The method of claim 4, further comprising sending the information element on an interface between the radio network controller and another radio network controller for relay to another network element for configuring an uplink between the another network element and the user equipment.

7. The method of claim 4, wherein said radio network controller is responsive to signaling from said network element with a proposed value or values for said cell specific parameter, said radio link specific parameter, or both, and said radio network controller carries out said sending said information either confirming or changing said proposed value or values.

8. The method of claim 6, wherein said configuring the uplink between the another network element and the user equipment comprises configuring the uplink between the another network element and the user equipment followed by sending the payload packet from the user equipment to the another network element over the uplink between the user equipment and the another network element for sending the payload packet to the radio network controller.

9. The method of claim 8, further comprising:
acknowledging correct reception of the payload packet at the network element on a radio downlink from the network element to the user equipment, and
acknowledging correct reception of the payload packet at the another network element on a radio downlink from the another network element to the user equipment.

10. A system, comprising:
a network element and a radio network controller connected by a signaling interface and arranged to configure a first radio uplink from a user equipment to the network element, the signaling interface being arranged to convey messages having information that contain parameters from the radio network controller to the network element,
wherein the information has both a cell specific parameter and a radio link specific parameter, and is conveyed in respective messages on the signaling interface between the network element and the radio network controller,
wherein the user equipment is arranged to send a payload packet to the network element over the first radio uplink after the first radio uplink is configured at the user equipment for sending the payload packet to the radio network controller,
wherein at least one of said respective messages is arranged to enable said configuring the first radio uplink, and
wherein the information is arranged to configure a second radio uplink between the second network element and the user equipment, the first radio network controller being configured to receive a payload packet from the network element over the signaling interface, a second radio network controller being configured to receive the payload packet from a second network element after receipt by the network element from the user equipment over the second radio uplink, and the radio network controller being configured to send the payload packet received from the network element to the radio network controller following the reception by the network element from the user equipment for transfer from the radio network controller.

11. A data structure configured to be at least temporarily stored in a non-transitory computer readable medium, the data structure comprising:
information having both a cell specific parameter and a radio link specific parameter to be transferred in respective messages on an interface from a network element radio network controller in order to configure a radio uplink from a user equipment to the network element,
wherein said configuring is carried out in order to enable transmission of a payload packet from the user equipment to the network element over the radio uplink and from the network element to the radio network controller,
wherein at least one of said respective messages enables said configuring the radio uplink, and
wherein prior to said transferring of said information on said interface between said network element and said radio network controller, said radio network controller decides a value for said cell specific parameter or said radio link specific parameter, or both, for said sending said information element with said cell specific parameter and said radio link specific parameter in said respective messages on said interface from said radio network controller to said network element.

12. Apparatus comprising:
a first interface configured to communicate information having both a cell specific parameter and a radio link specific parameter in respective messages to a network element from the apparatus in order to configure a radio uplink from user equipment to the network element; and
a second interface configured to communicate the information between the apparatus which is a radio network controller and a second radio network controller connected to a second network element,
wherein at least one of said respective messages is arranged to enable said configuring the radio uplink, and
wherein prior to communicating said information on said first interface between said network element and said apparatus, said apparatus is configured to decide a value for said cell specific parameter or said radio link specific parameter, or both, for sending said information with said cell s ecific arameter and said radio link s ecific arameter in said respective messages on said first interface from said apparatus to said network element.

13. Apparatus comprising:
a first interface arranged to communicate information having both a cell specific parameter and a radio link specific parameter in respective messages between the apparatus, which is a network element, and a radio network controller in order to configure an uplink channel on a radio link; and
a second interface arranged to communicate signals related to said configuring the uplink channel between the network element and a user equipment, and arranged to receive a payload packet from the user equipment to the network element over the radio uplink after said configuring the uplink channel on the radio link is carried out by the network element,
wherein the first interface is also arranged to convey the payload packet from the network element to the radio network controller following the reception by the network element from the user equipment,
wherein at least one of said respective messages is arranged to enable said configuring the uplink, and
wherein prior to communicating said information on said first interface between said apparatus and said radio network controller a value is decided by said radio network controller for said cell specific parameter or said radio link specific parameter, or both, for sending said information with said cell specific parameter and said radio link specific parameter in said respective messages on said first interface from said radio network controller to said apparatus.

14. A data structure for at least temporary storage in a non-transitory computer readable medium, the data structure comprising:
information having both a cell specific parameter and a radio link specific parameter for transfer in respective messages on an interface between a network element and a user equipment in order to configure a radio uplink from the user equipment to the network element,
wherein said configuring is carried out at the network element, for enabling transmission of a payload packet from the user equipment to the network element over the radio uplink and from the network element to the radio network controller,
wherein at least one of said respective messages is arranged to enable said configuring the radio uplink, and
wherein prior to said sending said information on said interface between said network element and said radio network controller, said radio network controller decides a value for said cell specific parameter or said radio link specific parameter, or both, for said sending said information with said cell specific parameter and said radio link specific parameter in said respective messages on said interface from said radio network controller to said network element.

15. Apparatus comprising:

a first means for communicating information having both a cell specific parameter and a radio link specific parameter in respective messages between the apparatus, which is a network element, and a radio network controller for configuring an uplink channel on a radio link; and a second means for communicating signals related to said configuring the uplink channel between the network element and a user equipment, and arranged to receive a payload packet from the user equipment to the network element over the radio uplink after said configuring the uplink channel on the radio link is carried out by the network element, wherein the first means is also for conveying the payload packet from the network element to the radio network controller following the reception by the network element from the user equipment, wherein at least one of said respective messages is arranged to enable said configuring the uplink, and wherein prior to communicating said information by said first means between said apparatus and said radio network controller a value is decided by said radio network controller for said cell specific parameter or said radio link specific parameter, or both, for sending said information with said cell specific parameter and said radio link specific parameter in said respective messages by said first means from said radio network controller to said apparatus.

16. The apparatus of claim 15, wherein the network element is arranged to acknowledge reception of the payload packet, on a radio downlink from the network element to the user equipment.

* * * * *

UNITED STATES PATENT AND TRADEMARK OFFICE
CERTIFICATE OF CORRECTION

PATENT NO.         : 8,243,633 B2                    Page 1 of 1
APPLICATION NO.    : 10/802391
DATED              : August 14, 2012
INVENTOR(S)        : Hwang et al.

It is certified that error appears in the above-identified patent and that said Letters Patent is hereby corrected as shown below:

Claim 1, col. 16, line 5 delete "said".

Claim 10, col. 17, line 28 delete "second".

Claim 11, col. 17, line 48 add --to a-- in front of uplink.

Claim 11, col. 17, line 61 delete "element".

Claim 12, col. 18, line 3 add --a-- in front of user.

Claim 12, col. 18, line 15 delete "s ecific" and insert --specific--.

Claim 12, col. 18, line 15 delete "s ecific" and insert --specific--.

Signed and Sealed this
Twenty-third Day of October, 2012

David J. Kappos
*Director of the United States Patent and Trademark Office*